Feb. 11, 1941.　　　　　L. R. HILL　　　　　2,231,718
INORGANIC MICA BONDING MATERIAL
Filed Jan. 10, 1940

WITNESSES:

INVENTOR
Lawrence R. Hill.
BY
ATTORNEY

Patented Feb. 11, 1941

2,231,718

UNITED STATES PATENT OFFICE 2,231,718

INORGANIC MICA BONDING MATERIAL

Lawrence R. Hill, Wilkinsburg, Pa., assignor to Westinghouse Electric & Manufacturing Company, East Pittsburgh, Pa., a corporation of Pennsylvania Application January 10, 1940, Serial No. 313,252

7 Claims. (Cl. 154—2.6)

This invention relates to the production of composite insulating members comprising mica flakes and a binder.

Heretofore sheets of insulating mica material of a size and thickness suitable for commercial use have been made by cementing sheets or flakes of mica with insulating binders, such as shellac. Shellac is unsatisfactory as a binder for insulating sheets which may be subjected to temperatures above 85° C. since shellac softens at this temperature and its dielectric properties begin to deteriorate rapidly at temperatures above 75° C.

The object of this invention is to provide a binding material for mica flakes which when embodied in an insulating member is capable of withstanding a wide range of temperatures.

The invention, accordingly, comprises the several steps and the relation and order of one or more of such steps with respect to each of the others and the article possessing the features, properties and the relation of elements which are exemplified in the following detailed disclosure and the scope of the application of which will be indicated in the claims.

Figure 1:
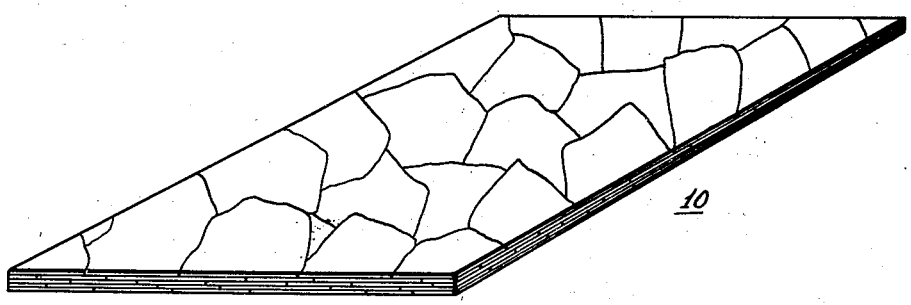
Figure 2:
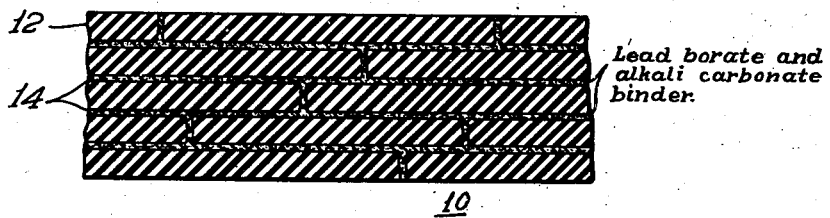

The invention will be understood most readily from the following detailed description thereof when considered in connection with the accompanying drawing which is representative of one embodiment of the invention and in which:

Figure 1 is a perspective view of an insulating panel according to the invention; and Fig. 2 is an enlarged cross-sectional view of a portion of the insulating panel.

Electrical apparatus often operates at temperatures at which insulating sheets of mica bonded with shellac would rapidly fail. In certain electrical applications, it is desirable to have insulators employing an insulating binding material capable of withstanding temperatures up to 350° C. without either deforming or losing its resistivity and dielectric features. At the same time it would be advantageous to be able to have the binder thermoplastic and readily formable at temperatures only slightly above 350° C. It is a purpose of this invention to provide a binder for mica flakes, which has high temperature utility and is thermoplastic at practical temperatures.

The insulating material with which the binder of the invention is particularly intended to be used is the natural mineral known as mica. Mica comes in sheet and flake form. It has a high dielectric strength and an extremely low power factor, and retains these properties up to temperatures of 600° C. Mica does not soften physically until temperatures of 1200° C. have been reached. Further, it is substantially nonhygroscopic, and may be applied successfully under a wide range of conditions. These properties have resulted in the use of mica in enormous quantities in electrical apparatus.

Mica sheets of practical size for direct application to electrical uses are costly and in some cases would be unobtainable. Therefore, it is the general practice to cement layers of small flakes or sheets of mica with an insulating binder to form insulators of sizes useable in the electrical industry.

A particularly advantageous binding material for mica flakes is lead borate. Lead borate has properties comparable with those of mica itself. For example, lead borate such as is suitable for insulator purposes fuses in a temperature range from 480 C. to 700° C., and retains excellent dielectric properties up to about the temperature of fusion. Lead borate does not absorb moisture once it has been fused.

In the prior art, lead borate was employed in the form of a powder or dust and had all the disadvantages encountered in handling powders and dusts. It is difficult to make uniform coatings with dusts. Special precautions are necessary to avoid lead poisoning in making dust coatings. Lead borate must be heated nearly to the fusion point of from 480° C. to 700° C. in order to be molded with any facility, and this high temperature introduces manufacturing difficulties.

To overcome the disadvantage of a high melting point, I resort to a binder comprising lead borate and an alkali carbonate. The preferred proportion of alkali carbonate is so selected that the fusion point is lowered to about 400° C. The lead-borate-carbonate forms a glass upon fusion which possesses the same desirable electrical insulating properties as lead borate alone. This lead-borate-carbonate binder forms an effective electrical insulator at high temperatures up to 350° C.

The method of preparing the bonding material of lead-borate-carbonate comprises the following steps: Lead borate is generally manufactured by mixing five parts of litharge or lead oxide by weight with two parts of boric acid. The mixture is heated in an oven. Reaction takes place and results in the formation of lead borate ($Pb(BO_2)_2$). The lead borate so formed is removed from the oven before it is heated to the melting or fusion temperature.

The reacted product is of a somewhat coarse and porous nature, and may be readily ground or crushed to any suitable fineness.

Lead borate, as such, may be purchased or may be manufactured in other ways. From whatever source obtained, the lead borate is ground or crushed to a powder for further mixing with the alkali carbonate.

In making the lead-borate-carbonate binder, from 1 to 15 parts of an alkali carbonate is added to the ground lead borate. The melting point of the mixture is lowered in proportion to the amount of alkali added. The carbonates preferable for this application are sodium carbonate, potassium carbonate and lithium carbonate. Lead oxide may be added to this composition up to 50% by weight. A satisfactory mixture of lead borate and alkali carbonate is as follows: lead borate 95% and lithium carbonate 5%. Other carbonates may be added in the same proportions. The mixture is ground to a powder of from 300 mesh to 600 mesh fineness. This grinding also insures a thorough mixing of the ingredients.

In order to obviate the necessity of handling dusts, it has been found that a suspension of the finely ground lead-borate-carbonate in a liquid is most satisfactory. A suspension which may be applied to mica flakes employs ethyl alcohol as the carrying agent. It has been found that the lead-borate-carbonate powder cannot be easily suspended in water.

The satisfactory proportions of lead-borate-carbonate powder to alcohol consists of 30% of the powder mixture and 70% of the alcohol. These proportions may be varied to suit manufacturing requirements. The lead-borate-carbonate powder forms a very uniform dispersion in the alcohol and does not settle readily.

Referring to Fig. 1 of the drawing there is illustrated an insulating plate or panel 10 comprising a plurality of layers of mica flakes or splittings 12 bonded to each other with the inorganic binder composed of lead-borate-carbonate. As shown in Fig. 2, the mica flakes 12 are bonded together by means of the binder 14 which is composed of the lead-borate-carbonate.

The insulating plate 10 is formed from layers of mica flakes 12 laid by hand or in the usual mica laying machines. The layer of material is then passed under a trough from which the alcoholic suspension of lead-borate-carbonate drips in much the same manner as the shellac distributors function upon the standard mica laying machines. Other layers of mica may be placed on top of the original coated layer until a plate of the desired thickness is obtained.

The alcoholic carrier is removed by heating the impregnated mica layers in ovens to temperatures slightly above the normal boiling point of alcohol at atmospheric pressures. A suitable temperature for the evaporation of ethyl alcohol is about 200° C. or lower. It is desirable to evaporate the liquid at moderate temperatures to prevent breakdown of the alcohol with carbonaceous residue being formed. When the alcohol has evaporated, a uniform layer of lead-borate-carbonate 14 mixture is dispersed throughout the micaceous plate. The substantially dry mica plate is then heated in an oven at a temperature from 400° C. to 600° C. This temperature is sufficiently high to cause fusion of the borate mixture. At this point, the plate of mica is rolled with a heavy steel roller to firmly bind the mica splittings to each other. The plate is subsequently removed from the furnace, cooled, and trimmed to size.

The flat plate so obtained is directly useable in many instances in electrical apparatus.

Where it is desired to reshape the plate 10 to another given shape, it is reheated to temperatures from 400° C. to 500° C. and may be rolled, pressed or formed in any well known manner. For example, tubes of circular cross-section may be formed by rolling the composite mica plate 10 on a hot plate kept at 500° C. The cylindrical tubes may be then shaped into tubes of any specified cross-section by reheating close to the softening point of the borate, that is, 400° C. to 500° C., and a split mandrel of the desired shape forced into the round tube which is thereby formed on the mandrel to the particular shape wanted.

The built-up mica plate 10 obtained by this process is electrically stable below 350° C., and has a very high mechanical strength. The mica plate is sufficiently flexible and elastic to withstand mechanical shocks which would shatter glass or porcelain insulators. Its insulating properties are high. The bond of borate material is perfectly distributed and the solvent evaporates without leaving any carbonaceous deposit.

The liquid in which the borate mixture is suspended is preferably composed of the lower alcohols which evaporate rapidly at low temperatures. The higher alcohols tend to break down and leave a carbonaceous deposit. Free carbon, in conjunction with lead borate, may reduce the borate and form particles of free lead. Metallic lead would be undesirable in the insulating material.

Various other methods of applying the suspension of borate will be obvious to those skilled in the art. It may be applied with brushes or by spraying or any other well known procedure.

Since certain changes may be made in the above description and different embodiments of the invention may be made without departing from the spirit thereof, it is intended that all the matter contained in the above description shall be considered as illustrative and not in a limiting sense.

I claim as my invention:

1. A composite material comprising mica flakes and a binder for binding the flakes together, the binder composed of an alcoholic suspension of a mixture of lead borate, lead oxide and an alkali carbonate.

2. A composite material comprising a flake insulating material and a binder for the flakes, the binder comprising an alcoholic suspension of a finely ground mixture of 70 parts of lead borate, not more than 20 parts of lead oxide and 1 to 10 parts of an alkali carbonate, said suspension being applied to the flakes, the solvent being evaporated and the whole being consolidated under temperature and pressure.

3. A binder comprising a monohydric alcoholic suspension of a finely pulverized mixture of 70 parts of lead borate, not more than 20 parts of lead oxide and 1 to 20 parts of an alkali carbonate.

4. A composition of matter for use as a binding material comprising a suspension in a monohydric alcohol of a material composed of lead borate ground to a fineness of from 300 to 600 mesh.

5. The method of forming a laminated structure comprising forming a layer of micaceous material, applying to the layer of material a binder comprising a suspension of a finely ground mixture of lead borate, lead oxide and an alkali carbonate in an alcoholic carrier, evaporating said alcoholic carrier at a low temperature and consolidating the layers of material and the binder at a higher temperature and under pressure.

6. A composite material comprising mica flakes and a binder for bonding the flakes together, the binder composed of an alcoholic suspension of a mixture of lead borate, lead oxide and lithium carbonate.

7. A composition of matter for use as a binding material comprising 100 parts lead borate and from 1 to 15 parts of lithium carbonate.

LAWRENCE R. HILL.